(12) United States Patent
Walker et al.

(10) Patent No.: US 9,221,967 B2
(45) Date of Patent: Dec. 29, 2015

(54) PREPARATION AND USE OF POLYMERIC DISPERSANT COMPOSITIONS

(75) Inventors: Janice S. Walker, Nacogdoches, TX (US); David C. Alexander, Austin, TX (US); Ernest L. Rister, Jr., Round Rock, TX (US); Robert B. Moore, Leander, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 100 days.

(21) Appl. No.: 13/509,960

(22) PCT Filed: Nov. 12, 2010

(86) PCT No.: PCT/US2010/056523
§ 371 (c)(1),
(2), (4) Date: May 15, 2012

(87) PCT Pub. No.: WO2011/068658
PCT Pub. Date: Jun. 9, 2011

(65) Prior Publication Data
US 2012/0309884 A1    Dec. 6, 2012

Related U.S. Application Data

(60) Provisional application No. 61/266,049, filed on Dec. 2, 2009.

(51) Int. Cl.
| | | |
|---|---|---|
| C08L 33/02 | (2006.01) | |
| B01F 17/00 | (2006.01) | |
| C09C 1/36 | (2006.01) | |
| C09C 3/10 | (2006.01) | |
| C09C 1/24 | (2006.01) | |
| C08L 35/00 | (2006.01) | |

(52) U.S. Cl.
CPC .............. *C08L 33/02* (2013.01); *B01F 17/005* (2013.01); *C08L 35/00* (2013.01); *C09C 1/24* (2013.01); *C09C 1/3676* (2013.01); *C09C 3/10* (2013.01); *C01P 2006/22* (2013.01); *C08F 2800/10* (2013.01)

(58) Field of Classification Search
CPC ........... C08L 33/02; C08L 35/00; C08F 8/32; B01F 17/005
USPC ........................................ 524/556; 525/329.9
See application file for complete search history.

(56) References Cited

U.S. PATENT DOCUMENTS

| | | | |
|---|---|---|---|
| 4,175,066 A | 11/1979 | Shibazaki et al. | |
| 5,336,728 A | 8/1994 | Humphries et al. | |
| 6,071,994 A * | 6/2000 | Hummerich et al. | ......... 524/247 |
| 6,444,771 B1 | 9/2002 | Yamaguchi et al. | |
| 6,846,882 B2 * | 1/2005 | Kroner et al. | .............. 525/330.1 |
| 2003/0224055 A1 * | 12/2003 | Lewis et al. | ................... 424/486 |
| 2006/0025316 A1 | 2/2006 | Covitch et al. | |

FOREIGN PATENT DOCUMENTS

DE    19735958    *    2/1999

OTHER PUBLICATIONS

Wikipedia article "pigment," http://web.archive.org/web/20091119084851/http://en.wikipedia.org/wiki/Pigment; Nov. 2009.*

Nguyen, et al. "Effect of Polyether Monoamine Structure on Pigment Dispersant Properties", Mar. 10, 2006, retrieved from Internet.

Nguyen et al. "Effect of Polyether Monoamine Structure on Pigment Dispersant Properties", (Abstract) *Paint & Coatings Industry* vol. 22, No. 3, pp. 32-34, 36, 38. Mar. 2006, retrieved from Internet.

* cited by examiner

*Primary Examiner* — Roberto Rabago
(74) *Attorney, Agent, or Firm* — Huntsman International LLC

(57) ABSTRACT

Embodiments of the present invention disclose polymeric dispersants that are the reaction product of a polymeric acid and a hydrophilic amine.

16 Claims, No Drawings

PREPARATION AND USE OF POLYMERIC DISPERSANT COMPOSITIONS

STATEMENT REGARDING FEDERALLY SPONSORED RESEARCH OR DEVELOPMENT

Not applicable.

BACKGROUND OF THE INVENTION

1. Field of the Invention

The present invention relates generally to polymeric dispersant compositions, in particular novel compositions formed from a reaction product of a polymeric acid and a hydrophilic amine and their use in aqueous dispersion applications.

2. Background of the Invention

With an increasing focus on providing greener dispersion formulations, the use of aqueous systems is preferred to oil-based counterparts. However, current aqueous dispersions have drawbacks such as low pigment loading, large particle size requirements, poor foaming characteristics and instability.

Dispersants, such as those listed in U.S. Pat. No. 6,846,882, have been developed to overcome the problems listed above. This patent describes an array of dispersants containing sulfur that are produced by a condensation reaction. This condensation reaction has the disadvantages of requiring high temperatures and necessitating the removal of the water in order to drive the reaction to completion. To assist with water removal, the reaction may need to be run under reduced pressure. Because of these drawbacks, other dispersants are desired.

BRIEF SUMMARY OF SOME OF THE PREFERRED EMBODIMENTS

Embodiments of the present invention disclose a composition that is a reaction product of a polymeric acid and a hydrophilic amine. The polymeric acid is a copolymer of acrylic acid and maleic acid. The hydrophilic amine has a molecular weight of at least about 100.

Embodiments of the present invention also disclose a dispersion composition that includes a polymeric dispersant and at least one dispersed particle. The polymeric dispersant is a reaction product of a polymeric acid and a hydrophilic amine. The polymeric acid is a copolymer of acrylic acid and maleic acid. The hydrophilic amine has a molecular weight of at least 100.

Embodiments of the present invention further disclose a method of dispersing at least one particle in an aqueous medium. The method provides at least one particle and at least one polymeric dispersant. The method combines at least one particle and polymeric dispersant in an aqueous medium. The polymeric dispersant is a reaction product of a polymeric acid and a hydrophilic amine. The polymeric acid is a copolymer of acrylic acid and maleic acid. The hydrophilic amine has a molecular weight of at least 100.

Embodiments of the present invention further disclose a method for producing a polymeric dispersant. The method provides at least one polymeric acid comprising a copolymer of an acrylic acid and a maleic acid and at least one hydrophilic amine having a molecular weight of at least about 100. The method reacts the at least one polymeric acid and at least one hydrophilic amine in a non-condensation reaction at a temperature less than 100° C. In an embodiment, the polymeric acid has not been neutralized.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Embodiments of the present invention disclose a composition that is a reaction product of a polymeric acid and a hydrophilic amine. The polymeric acid comprises a copolymer of acrylic acid and maleic acid. Acrylic acid, also called 2-propenoic acid, has the formula $CH_2CHCO_2H$. It is an unsaturated carboxylic acid. The second part of the copolymer is maleic acid. Maleic acid is also called (Z)-butenedioic acid, cis-butenedioic acid, malenic acid, maleinic acid or toxilic acid. Maleic acid has the formula $C_4H_4O_4$, and it is a dicarboxylic acid (molecule with two carboxyl groups). The acrylic acid and maleic acid are reacted to form a copolymer which is referred to as the polymeric acid of the present invention. In embodiments of the present invention, the copolymer of acrylic acid and maleic acid may have any ratio from about 1:1 to about 1:7.5 moles of acrylic acid to moles of maleic acid. The polymeric acid may be commercially obtained as a poly(acrylic acid-co-maleic acid) 50% solution from Sigma-Aldrich Co. of St. Louis, Mo. under catalog number 416053.

Embodiments of the present invention react the polymeric acid with a hydrophilic amine that has a molecular weight of at least about 100. In embodiments of the present invention, the hydrophilic amine is a mono-primary amine, namely, an amine with only one primary amine. In an embodiment, the hydrophilic amine is a polyethermonoamine. The polyethermonoamines may have ethylene oxide to propylene oxide (EO/PO) ratios from about 58:8 to about 19:3. In another embodiment, the hydrophilic amine may be selected from dimethylaminopropylamine, dimethylaminoethoxypropylamine, 2-(2-dimethylaminoethoxy) ethanol and combinations thereof. The hydrophilic amine may comprise one or more amines. In some embodiments the hydrophilic amine has a molecular weight of at least about 100 to about 3,000. In an embodiment, the hydrophilic amine has a molecular weight of about 1,000. In another embodiment, the hydrophilic amine has a molecular weight of about 2,000. Commercially available examples of suitable hydrophilic amines include SURFONAMINE® L-207 amine, which is a relatively hydrophilic polyethermonoamine of approximately 2,000 molecular weight, that is commercially available from Huntsman Corporation of The Woodlands, Tex. (SURFONAMINE is a registered mark of Huntsman Corporation). SURFONAMINE L-100 amine is a hydrophilic polyethermonoamine of approximately 1000 molecular weight that is also commercially available from Huntsman Corporation of The Woodlands, Tex. One skilled in the art, with the benefit of this disclosure will recognize other suitable hydrophilic amines for use with this invention.

Embodiments of the present invention further disclose a method for producing a polymeric dispersant. The method reacts at least one polymeric acid and at least one hydrophilic amine having a molecular weight of at least about 100 in a non-condensation reaction at a temperature less than 100° C. In an embodiment, the polymeric acid has not been neutralized.

The polymeric dispersant may be produced in the following manner. The polymeric acid may be added gradually to the hydrophilic amine. A polymeric catalyst, such as AMBERLYST™ 36 polymeric catalyst may be used in this stage. AMBERLYST™ 36 polymeric catalyst is commercially available from Rohm and Haas Company of Philadelphia, Pa. AMBERLYST is a registered mark of Rohm and Haas Company. The polymeric acid solution is added to the hydrophilic amine while being heated from about 50° C. to less than 100° C. In some embodiments the mixture is heated to 60° C., 70° C., 90° C. and 95° C. Once this temperature was reached, the temperature is maintained. After polymeric acid addition is complete, the solution is heated under nitrogen for 4 hours at the set temperature. The reaction product may be diluted with de-ionized water for ease in formulating in aqueous inorganic pigment dispersions.

The polymeric dispersant may be produced by a non-condensation reaction between the polymeric acid with the hydrophilic amine. By a non-condensation reaction, it is meant that water is not formed during this reaction. This process has advantages over current processes, such as those described in U.S. Pat. No. 6,846,882, which describes a process that forms water that must be removed in order to drive the reaction to completion.

The ratio of polymeric acid to hydrophilic amine may be adjusted depending on the desired outcome of the product. In some embodiments the ratio is from about 0.5-2.0:1.0 polymeric acid to hydrophilic amine. In other embodiments, the polymeric acid is reacted with the hydrophilic amine in a ratio of about 0.8-1.2:1.0 polymeric acid to hydrophilic amine. In an embodiment, the ratio is from about 1.0:1.0 polymeric acid to hydrophilic amine. One skilled in the art will recognize how to adjust the ratios described above to obtain a polymeric dispersant with a desired characteristic, for example, a desired pH.

The polymeric dispersants of the present invention may have molecular weights from about 45,000 to about 50,000. In other embodiments, the dispersants of the present invention have a molecular weight below about 100,000.

The polymeric dispersants of the present invention, due to the lower reaction temperature, may form predominantly salt products. Other embodiments may produce salt and amide mixtures. This is different than the dispersants disclosed under U.S. Pat. No. 6,846,882, which, due to their higher reaction temperatures, are thought to form predominantly amide products.

Embodiments of the present invention also disclose a dispersion composition that includes a polymeric dispersant and at least one particle. The at least one particle, or dispersed particle, may include any organic or inorganic material. The inorganic materials may include any inorganic oxides. Inorganic pigments are suitable particles. In an embodiment, the inorganic pigment is an iron oxide. Commercially suitable inorganic pigments include transparent iron oxide (commercially available from Rockwood Pigments North America, Inc. of Beltsville, Md. under the tradename AC1000); red iron oxide (copperas iron oxide, commercially available from Elementis Pigments Inc. of East St Louis, Ill. under the name R1599D); and yellow iron oxide (commercially available from Rockwood Pigments North America, Inc. of Beltsville, Md. under the name YO1888D). Other embodiments may use particles such as cementatious particles, clays (such as kaolin, talc, other silicates), nanoparticles (such as nanotubes and fullerenes), chalk glass fibers, glass beads, metal powders, and boron nitrides. Any particle that is suitable for use in a dispersion may be used according to the teachings of the present invention.

Embodiments of the present invention disclose an aqueous dispersion composition. A typical dispersion composition of the invention may be as follows (percentages by weight):

| Polymeric Dispersant | 4-16% |
|---|---|
| Inorganic Pigment | 15-60% |
| Water | 25-85% |

Dispersions of the present invention may also include a glycol. Suitable glycols include POGOL® 400 polyethylene glycol, a polyethylene glycol of 400 molecular weight that is commercially available from Huntsman Corporation of The Woodlands, Tex. POGOL is a registerd mark of Huntsman Corporation.

Embodiments of the present invention may further comprise at least one additive. The additives may include co-solvents, surfactants, defoamers, fillers, preservatives, wetting agents, antisettling agents, waxes, rheological additives, thickeners, coalescing agents, thixotropic agents, surfactants, coating aids, biocides, sequestering agents and combinations thereof. One skilled in the art, with the benefit of this disclosure will recognize other suitable additives to use in embodiments of the present invention.

When the dispersion composition is produced, it may be vigorously mixed for sufficient wetting of pigment particles. Grinding media may be used to mill the dispersion composition into smaller particle sizes. One skilled in the art, with the benefit of this disclosure will recognize other suitable methods and techniques of producing a dispersion composition of a desired size and form.

Embodiments of the present invention further teach a method of dispersing at least one particle in an aqueous medium. The method provides at least one particle and at least one polymeric dispersant. The method contacts the at least one particle and polymeric dispersant in an aqueous medium. By aqueous medium, it is meant a solution in which the predominant solvent is water.

Polymeric dispersants of the present invention, as well as dispersion compositions disclosed herein, may find suitable applications in paint, stain, color concentrates, ink and coating applications. Additionally, embodiments of the present invention may be used in other applications such as construction (cementitious and gypsum-board materials), mining, agriculture, and oil field applications. One skilled in the art, with the benefit of this disclosure will recognize other suitable applications for polymeric dispersants of the present invention.

Embodiments of the present invention will be further illustrated by a consideration of the following examples, which are intended to be exemplary of the invention.

EXAMPLES

Preparation of Polymeric Dispersant Examples

Preparation #1: (8453-26): 150.48 g poly(acrylic acid-co-maleic acid) (50% sol.) was added gradually to 102.28 g dimethylaminopropylamine (DMAPA) [1.0:1.0 polymeric acid to hydrophilic amine equivalents ratio] and 5.0 g AMBERLYST™ 36 polymeric catalyst. The polymeric acid solution was added to the hydrophilic amine while being heated to 90° C. Once this temperature was reached, the temperature was maintained. After polymeric acid addition was complete, the solution was heated under nitrogen for 4 hours at 90° C.

Preparation #2: (8667-074-A) 219.45 g poly(acrylic acid-co-maleic acid) (50% sol.) was added to 307.06 g dimethylaminoethoxypropylamine (DMAEPA) [1.0:1.0 polymeric acid to hydrophilic amine equivalents ratio] and 15.0 g AMBERLYSTT™ 36 polymeric catalyst. The polymeric acid solution was added to the hydrophilic amine while being heated to 90° C. Once this temperature was reached, the temperature was maintained. After polymeric acid addition was complete, the solution was heated under nitrogen for 4 hours at 90° C.

Preparation #3: (8740-081-A) 60.0 g poly(acrylic acid-co-maleic acid) (50% sol.) was added to 800.0 g SUR-FONAMINE® L-207 amine [1.0:1.0 polymeric acid to hydrophilic amine equivalents ratio]. The polymeric acid solution was added to the hydrophilic amine while being heated to 90° C. Once this temperature was reached, the temperature was maintained. After polymeric acid addition was complete, the solution was heated under nitrogen for 4 hours at 90° C.

Preparation #4: (8740-088-A) 60.0 g poly(acrylic acid-co-maleic acid) (50% sol.) was added to 400.0 g SUR-FONAMINE® L-100 amine [1.0:1.0 polymeric acid to hydrophilic amine equivalents ratio]. The polymeric acid solution was added to the hydrophilic amine while being heated to 90° C. Once this temperature was reached, the temperature was maintained. After polymeric acid addition was complete, the solution was heated under nitrogen for 4 hours at 90° C.

Preparation #5: (8739-0,6-A) This preparation was a control that did not use any maleic acid in the polymeric acid. 28.8 g poly acrylic acid (NOVERITE™ K-7058 polyacrylate, 7300 mw) was added to 400.0 g SURFONAMINE® L-100 amine [1.0:1.0 polymeric acid to hydrophilic amine equivalents ratio]. NOVERITE™ K-7058 polyacrylate is a water soluble, partially neutralized acrylic acid polymer. NOVERITE™ K-7058 polyacrylate is commercially available from The Lubrizol Corporation of Cleveland, Ohio. NOVERITE is a trademark of The Lubrizol Corporation. The polymeric acid solution was added to the hydrophilic amine while being heated to 70° C. Once this temperature was reached, the temperature was maintained. After polymeric acid addition was complete, the solution was heated under nitrogen for 4 hours at 70° C.

Preparation #6: (8739-0,7-A) 64.7 g poly(acrylic acid-co-maleic acid) (50% sol.) was added to 360.0 g SUR-FONAMINE® L-100 amine [1.2:1.0 polymeric acid to hydrophilic amine equivalents ratio]. The polymeric acid solution was added to the hydrophilic amine while being heated to 70° C. Once this temperature was reached, the temperature was maintained. After polymeric acid addition was complete, the solution was heated under nitrogen for 4 hours at 70° C.

Preparation #7: (8739-0,8-A) 52.92 g poly(acrylic acid-co-maleic acid) (50% sol.) was added to 440.0 g SUR-FONAMINE® L-100 amine [0.8:1.0 polymeric acid to hydrophilic amine equivalents ratio]. The polymeric acid solution was added to the hydrophilic amine while being heated to 70° C. Once this temperature was reached, the temperature was maintained. After polymeric acid addition was complete, the solution was heated under nitrogen for 4 hours at 70° C.

Preparation #8: (8739-0,9-A) 120.0 g poly(acrylic acid-co-maleic acid) (50% sol.) was added to 400.0 g SUR-FONAMINE® L-100 amine [2.0:1.0 polymeric acid to hydrophilic amine equivalents ratio]. The polymeric acid solution was added to the hydrophilic amine while being heated to 70° C. Once this temperature was reached, the temperature was maintained. After polymeric acid addition was complete, the solution was heated under nitrogen for 4 hours at 70° C.

Preparation #9: (8739-021-A) 116.3 g poly(acrylic acid-co-maleic acid) (50% sol.) was added to 776.0 g SUR-FONAMINE® L-100 amine [1.0:1.0 polymeric acid to hydrophilic amine equivalents ratio]. The polymeric acid solution was added to the hydrophilic amine while being heated to 70° C. Once this temperature was reached, the temperature was maintained. After polymeric acid addition was complete, the solution was heated under nitrogen for 4 hours at 70° C.

In the following Comparative Examples, the following procedures were used:

Eiger Mill Procedure: An Eiger Laboratory Mini Mill (Mini-100-VSE-TEFV, commercially available from Eiger Machinery, Inc. of Grayslake, Ill.) was used. First, the chiller (a VWR Chiller available from VWR International, LLC. of West Chester, Pa.) temperature was set to 15° C. This cooled the bead compartment to prevent overheating of the millbase. Second, the polymeric dispersant, a defoamer and water were added in a stainless steel cup and mixed for 1 minute via a Waring Variable Speed Laboratory Blender (commercially available from the Waring division of Conair Corporation of East Windsor, N.J.). Third, the particle (an inorganic pigment) was added in three equal portions to the above mixture and mixed after each addition for 30 seconds. Fourth, the entire mixture was mixed in the blender at about 1600 rpm for 10 minutes. Fifth, the mixture was then transferred to the Eiger Mill. Sixth, the mixture was milled at 5000 rpm for 10 minutes. Seventh, a milled sample was removed. Eighth, the mill was cleaned with de-ionized water until clear.

FLACKTEK™ SpeedMixer Procedure: a FLACKTEK™ SpeedMixer (model DAC150 FVZ, commercially available from FlackTek Inc. of Landrum, S.C.; FLACKTEK is a trademark of FlackTek Inc.). Approved containers (FLACK-TEK™ 501 223T Max 40 cups) were used for this procedure. First, a polymeric dispersant of the present invention, a defoamer and water were added to a plastic container. Second, the mixture was mixed at 3000 rpm for 20 seconds. Third, the container was removed and a particle (an inorganic pigment) was added. Fourth, the mixture was then mixed at 3000 rpm for 20 seconds. Fifth, the container was removed and 20 g of glass beads were added. Sixth, the mixture was mixed at 3000 rpm for 2 minutes.

Comparison Example #1

8740-047

Five formulations were prepared using a dispersant, water, polyethylene glycol (PEG) and a particle (an inorganic pigment: transparent iron oxide (AC1000)). Dispersion compositions were prepared using the Eiger Mill procedure. The dispersants compared were:

1) Preparation #2, dimethylaminoethoxypropyl-amine and acrylic acid maleic acid copolymer 3000 mw (50% sol.).
2) Preparation #1, dimethylaminopropylamine and acrylic acid maleic acid copolymer, 3000 mw (50% sol.).
3) Commercial Control Dispersant #1, an alkylolammonium salt of a lower molecular weight polycarboxylic acid polymer (commercially available from the Byk-Chemie division of The ALTANA Group of Wesel, Germany under the product code LP-N20897).

TABLE 1

Formulations of Comparison Example #1

|  | Dispersant (g) | Water (g) | % Pigment | PEG (g) | % DOP |
|---|---|---|---|---|---|
| Prep. #2-A | 11.54 | 63.46 | 40 | 15 | 15 |
| Prep. #2-B | 7.69 | 67.31 | 40 | 15 | 10 |
| Prep. #1-A | 11.11 | 63.89 | 40 | 15 | 15 |
| Prep. #1-B | 7.41 | 67.59 | 40 | 15 | 10 |
| Cont. #1 | 12.86 | 62.14 | 40 | 15 | 15 |

% DOP is percent active dispersant on pigment.

TABLE 2

Results of Comparison Example #1

| Dispersant | % DOP | Hegman | Observation |
|---|---|---|---|
| Prep. #2-A | 15 | 8 | Low viscosity millbase |
| Prep. #2-B | 10 | 8 | Low viscosity millbase |
| Prep. #1-A | 15 | 8 | Low viscosity, no settling |
| Prep. #1-B | 10 | 6 | Pigment settling |
| Cont. #1 | 15 | — | Paste in blender, did not mill |

Millbase is defined as a mixture of milled pigment with additives.

Hegman is a particle size determination using a Hegman gauge. Hegman 8 is less than 1 um.

This Comparison Example #1 shows that the dispersants of the present invention display greater ease of handling when manufacturing because of lower particle size and lower viscosities. For ease of addition and mixing of pigment in paint and stain applications, smaller particle size is an indication of how well the particles are dispersed. The lower molecular weight amine dispersants also showed increased storage stability with the transparent iron oxide pigment.

Comparison Example #2

8739-069

Nine formulations were prepared using a dispersant, water, defoamer (as listed below Table 3), and an inorganic pigment (red iron oxide (R1599D)). Dispersion compositions were prepared using the Eiger Mill procedure. Dispersants compared were:

1) Commercial Control Dispersant #3: ZETASPERSE® 1200 pigment dispersing additive (commercially available from Air Products and Chemicals, Inc. of Allentown, Pa.). ZETASPERSE is a registered trademark of Air Products and Chemicals, Inc.

2) Commercial Control Dispersant #4: a hydrophilic copolymer polyelectrolyte (commercially available from the Rohm and Haas Company of Philadelphia, Pa. as TAMOL™ SG-1 dispersant. TAMOL is a mark of the Rohm and Haas Company.)

3) Commercial Control Dispersant #5: SURFONAMINE® L-100 amine (50% sol.).

4) Commercial Control Dispersant #6, a structured acrylate copolymer (commercially available from the Byk-Chemie division of The ALTANA Group of Wesel, Germany under the tradename DISPERBYK®-2010 High Molecular Weight Wetting and Dispersing Additive; DISPERBYK is a registered trademark of The ALTANA Group).

5) Commercial Control Dispersant #7: poly(acrylic acid-co-maleic acid) (50% sol.) which is commercially available from Sigma-Aldrich Co. under catalog number 416053.

6) 8734-60-38 SURFONAMINE® L-100 amine and poly(acrylic acid-co-maleic acid) 3000 mw (50% sol.) 50% polymeric dispersant.

7) Preparation #3: SURFONAMINE® L-207 amine and poly(acrylic acid-co-maleic acid) 3000 mw (50% sol.).

8) 8739-058-B SURFONAMINE® L-100 amine and poly(acrylic acid-co-maleic acid) [where the polymeric acid has 1.0:7.5 moles of acrylic acid to moles of maleic acid] (50% sol.). This polymeric acid is commercially available from Access Chemical of Hong Kong.

9) 8739-067-B SURFONAMINE® L-100 amine and poly(acrylic acid-co-maleic acid) [1.0:1.0 mole ratio equivalents polymeric acid to hydrophilic amine] (50% sol.) 50% polymeric dispersant.

The dispersant compositions 6, 8 and 9 were made according to the procedures outlined in the Preparations listed above.

TABLE 3

Formulations of Comparison Example #2

|  | Dispersant (g) | Water (g) | % Pigment | DF (g) | % DOP |
|---|---|---|---|---|---|
| Cont. #3 | 12.00 | 69.00 | 45 | 1.5 | 8 |
| Cont. #4 | 5.43 | 65.57 | 45 | 1.5 | 8 |
| Cont. #5 | 10.80 | 70.20 | 45 | 1.5 | 8 |
| Cont. #6 | 13.50 | 67.50 | 45 | 1.5 | 8 |
| Cont. #7 | 10.80 | 70.20 | 45 | 1.5 | 8 |
| 8734-60-38 | 10.80 | 70.20 | 45 | 1.5 | 8 |
| Prep. #3 | 5.57 | 75.43 | 45 | 1.5 | 8 |
| 8739-058-B | 10.80 | 70.20 | 45 | 1.5 | 8 |
| 8739-067-B | 10.80 | 70.20 | 45 | 1.5 | 8 |

DF is an oil free, nonsilicone defoamer designed for aqueous systems that is commercially available from Air Products and Chemicals, Inc. of Allentown, Pa. under the name SURFYNOL® DF-75 Defoamer. SURFYNOL is a registered trademark of Air Products and Chemicals, Inc.

% DOP is percent active dispersant on pigment.

TABLE 4

Results of Comparison Example #2

| Dispersant | Hegman | Viscosity, cPs | Observations |
|---|---|---|---|
| Cont. #3 | 6 | 12 |  |
| Cont. #4 |  |  | Mixture too thick to mill |
| Cont. #5 |  |  | Mixture too thick to mill |
| Cont. #6 | 6.5 | 4 |  |
| Cont. #7 |  |  | Mixture too thick to mill |
| 8734-60-38 | 8/7.5 | 32 |  |
| Prep. #3 | 8/7.5 | 4 |  |
| 8739-058-B | 8 | 32 |  |
| 8739-067-B | 8 | 24 |  |

Viscosity was measured using a Brookfield Viscometer, Model DV-II+ with #3 spindle at 30 rpms (commercially available from Brookfield Engineering Laboratories, Inc. of Middleboro, Mass.).

Hegman 8=1 um, Hegman 6=25 um. The first number is initial particle size, second number is particle size after 24 hours.

In Comparison Example #2, the polymeric dispersants of the present invention performed much better than the commercial control dispersants. Cont. #4, Cont. #5, and Cont. #7 did not perform well in this experiment. All were too viscous after initial mixing in blender to place in the Eiger Mill. The samples of the present invention were slightly more viscous than the Commercial Control Dispersants but the particle size was substantially smaller, 1 um verses 20-25 um. The Hegman particle size was done initially after milling and again after 24 hours. Samples 8734-60-38 and Prep. 3 did have a slight increase in particle size after 24 hours but particle size remained <5 um. Each of the milled samples did have some sediment visible after 24 hours. The viscosities of all milled samples were quite low.

Comparison Example #3

8739-028

Six formulations were prepared using the dispersants listed below, water and an inorganic pigment (red iron oxide (R1599D)). More detailed descriptions of the ingredients are listed above. Dispersions were prepared using the Eiger Mill procedure. Dispersants compared were:

1) 8740-088-C, SURFONAMINE® L-100 amine and acrylic acid maleic acid copolymer (AAMA) 3000 mw (50% sol.) [0.5:1.0 ratio equivalents polymeric acid to hydrophilic amine], 90° C. reaction temperature (51% polymeric dispersant).

2) 8739-025-B, SURFONAMINE® L-100 amine and AAMA (50% sol.), [0.5:1.0 ratio polymeric acid to hydrophilic amine], 70° C. reaction temperature (51% polymeric dispersant).

3) 8739-019-B, SURFONAMINE® L-100 amine and AAMA (50% sol.), [2.0:1.0 ratio polymeric acid to hydrophilic amine], 70° C. reaction temperature (50% polymeric dispersant).

4) 8739-0,6-B, SURFONAMINE® L-100 amine and poly acrylic acid (NOVERITE™ K-7058 polyacrylate) 7300 mw (50% sol.), [1.0:1.0 ratio polymeric acid to hydrophilic amine], 70° C. reaction temperature (52% polymeric dispersant).

5) Commercial Control Dispersant #4
6) Commercial Control Dispersant #3

The dispersants 1-4 were made according to procedures outlined in the Preparations listed above.

TABLE 5

Formulations of Comparison Example #3

| | Dispersant (g) | Water (g) | % Pigment | % DOP |
|---|---|---|---|---|
| 8740-088-C | 10.59 | 71.91 | 45 | 8.0 |
| 8739-025-B | 10.59 | 71.91 | 45 | 8.0 |
| 8739-019-B | 10.80 | 71.70 | 45 | 8.0 |
| 8739-016-B | 10.38 | 72.12 | 45 | 8.0 |
| Cont. #4 | 15.43 | 67.07 | 45 | 8.0 |
| Cont. #3 | 9.0 | 73.50 | 45 | 4.0 |

TABLE 6

Results of Comparison Example #3

| Dispersant | Hegman | Viscosity, cPs |
|---|---|---|
| 8740-088-C | 7.5 | 140 |
| 8739-025-B | 7.5 | 32 |

TABLE 6-continued

Results of Comparison Example #3

| Dispersant | Hegman | Viscosity, cPs |
|---|---|---|
| 8739-019-B | * | * |
| 8739-016-B | * | * |
| Cont. #4 | 6.5 | 16 |
| Cont. #3 | 6.5 | 16 |

* Pigment dispersion failed - did not test particle size or viscosity.

Comparison Example #3 shows that the dispersant preparation reaction temperature does slightly affect the viscosity of the millbase properties (compare 8740-088-C with a reaction temperature of 90° C. with 8739-025-B with reaction temperature of 70° C.). Also, an increase in the polymeric acid to hydrophilic amine ratio (8739-0,9-B 2:1) may result in a formulation with unacceptable performance. The dispersant without maleic acid (8739-0,6-B) did not perform well. A particle size improvement for 8740-088-C and 8739-025-B with Hegman 7.5 (about 5 um) verses 6.5 (about 15 um) for the controls. Twenty-four hour observations show that the commercial controls had more pigment settling and larger particle size than 8740-088-C and 8739-025-B.

Comparison Example #4

8739-044

Twenty-one dispersions were made with the following inorganic pigments: transparent iron oxide (TIO) as listed above in Comparison Example 1, red iron oxide (as listed above in Comparison Example 2 (RED), and yellow iron oxide (YEL)(YO1888D). Dispersions were prepared using the FLACKTEK™ SpeedMixer Procedure. Dispersant compared were:

1) Commercial Control Dispersant #7
2) Commercial Control Dispersant #5
3) Commercial Control Dispersant #4
4) Commercial Control Dispersant #3
5) 8734-60-38, SURFONAMINE® L-100 amine and AAMA (50% sol.), 70° C. reaction temperature which was prepared according to the procedure of the Preparations above.

TABLE 7

Formulations of Comparison Example #4

| | Dispersant (g) | Water (g) | % Pigment | DF (g) | % DOP |
|---|---|---|---|---|---|
| Cont. #7-A | 3.84 | 16.08 | 40 TIO | 0.0 | 16.0 |
| Cont. #7-B | 3.84 | 15.78 | 40 TIO | 0.3 | 16.0 |
| Cont. #5-A | 3.84 | 16.08 | 40 TIO | 0.0 | 16.0 |
| Cont. #5-B | 3.84 | 15.78 | 40 TIO | 0.3 | 16.0 |
| Cont. #4-A | 5.48 | 15.26 | 40 TIO | 0.0 | 16.0 |
| Cont. #4-B | 5.48 | 14.96 | 40 TIO | 0.3 | 16.0 |
| Cont. #3-A | 4.26 | 15.87 | 40 TIO | 0.0 | 16.0 |
| Cont. #3-B | 4.26 | 15.57 | 40 TIO | 0.3 | 16.0 |
| 8734-60-38-A | 3.84 | 16.08 | 40 TIO | 0.0 | 16.0 |
| 8734-60-38-B | 3.84 | 15.78 | 40 TIO | 0.3 | 16.0 |
| Cont. #4-C | 2.74 | 14.96 | 40 RED | 0.3 | 8.0 |
| Cont. #3-C | 2.13 | 15.57 | 40 RED | 0.3 | 8.0 |
| 8734-60-38-C | 1.92 | 15.78 | 40 RED | 0.3 | 8.0 |
| Cont. #4-D | 2.74 | 14.96 | 40 YEL | 0.3 | 8.0 |
| Cont. #3-D | 2.13 | 15.57 | 40 YEL | 0.3 | 8.0 |
| 8734-60-38-D | 1.92 | 15.78 | 40 YEL | 0.3 | 8.0 |
| Cont. #4-E | 4.11 | 7.59 | 60 RED | 0.3 | 8.0 |
| Cont. #3-E | 3.20 | 8.50 | 60 RED | 0.3 | 8.0 |
| 8734-60-38-E | 2.88 | 8.82 | 60 RED | 0.3 | 8.0 |

TABLE 7-continued

Formulations of Comparison Example #4

| | Dispersant (g) | Water (g) | % Pigment | DF (g) | % DOP |
|---|---|---|---|---|---|
| Cont. #3-F | 3.73 | 4.97 | 70 RED | 0.3 | 8.0 |
| 8734-60-38-F | 3.36 | 5.34 | 70 RED | 0.3 | 8.0 |

TABLE 8

Results of Comparison Example #4

| Dispersant | Pigment/DF | Hegman | Observation |
|---|---|---|---|
| Cont. #7-A | TIO | <6 | Paste |
| Cont. #7-B | TIO-DF | <6 | Paste |
| Cont. #5-A | TIO | | Very thick with sediment |
| Cont. #5-B | TIO-DF | | Paste |
| Cont. #4-A | TIO | <6 | Paste |
| Cont. #4-B | TIO-DF | <6 | Paste |
| Cont. #3-A | TIO | <6 | Very viscous |
| Cont. #3-B | TIO-DF | <6 | Very viscous |
| 8734-60-38-A | TIO | 6 | Liquid, no sediment |
| 8734-60-38-B | TIO-DF | 6 | Liquid, no sediment |
| Cont. #4-C | RED-DF | 6 | Liquid, sediment |
| Cont. #3-C | RED-DF | — | Foam, sediment |
| 8734-60-38-C | RED-DF | 8 | Low viscosity, no sediment |
| Cont. #4-D | YEL-DF | — | Paste, not wetted |
| Cont. #3-D | YEL-DF | — | Low viscosity, sediment |
| 8734-60-38-D | YEL-DF | 6 | Low viscosity, no sediment |
| Cont. #4-E | RED-DF | — | Paste |
| Cont. #3-E | RED-DF | 7 | Low viscosity, no sediment |
| 8734-60-3 8-E | RED-DF | 8 | Low viscosity, no sediment |
| Cont. #3-F | RED-DF | — | Not completely wetted |
| 8734-60-38-F | RED-DF | 8 | Very viscous, no sediment or separation |

Comparison Example #4 shows that the polymeric dispersants of the present invention have improved performance characteristics over its individual parts (the polymeric acid used individually and the hydrophilic amine used individually). Comparing the performance of the commercial control #7 (polymeric acid solution without hydrophilic amine), the commercial control #5 (hydrophilic amine diluted in water—sample without any polymeric acid), and the polymeric dispersant of the present invention (8734-60-38) demonstrates the improved performance of the polymeric dispersants of the present invention in transparent iron oxide, copperas iron oxide, and yellow iron oxide dispersions, including when the pigment loading in the mixture was up to 70%.

Comparison Example #5

8739-007

Red iron oxide (R1599D), the defoamer listed above, and dispersants listed below were added to form the following dispersion compositions that were prepared using the Eiger Mill procedure. Dispersants compared were:

1) Preparation #3.

2) 8739-06-B Surfonamine L-100 and Poly(acrylic acid-co-maleic acid) 3000 mw (50% sol.) (50% polymeric dispersant).

3) Commercial Control Dispersant #3

TABLE 9

Formulations of Comparison Example #5

| | Dispersant (g) | Water (g) | % Pigment | DF (g) | % DOP |
|---|---|---|---|---|---|
| Prep. #3-A | 5.57 | 103.43 | 45% | 1.0 | 6.0 |
| Prep. #3-B | 7.42 | 101.58 | 45% | 1.0 | 8.0 |
| Prep. #3-C | 9.28 | 99.72 | 45% | 1.0 | 10.0 |
| 8739-06-B1 | 7.20 | 101.80 | 45% | 1.0 | 4.0 |
| 8739-06-B2 | 14.40 | 94.60 | 45% | 1.0 | 8.0 |
| Cont. #3-A | 8.00 | 101.00 | 45% | 1.0 | 4.0 |
| Cont. #3-B | 16.00 | 93.00 | 45% | 1.0 | 8.0 |

% DOP is percent active dispersant on pigment.

TABLE 10

Results of Comparison Example #5

| Dispersant | % DOP | Hegman | Viscosity, cPs |
|---|---|---|---|
| Prep. #3-A | 6.0 | 8 | 12 |
| Prep. #3-B | 8.0 | 8 | 12 |
| Prep. #3-C | 10.0 | 8 | 28 |
| 8739-06-B1 | 4.0 | 8 | 24 |
| 8739-06-B2 | 8.0 | 8 | 48 |
| Cont. #3-A | 4.0 | 8 | 16 |
| Cont. #3-B | 8.0 | 8 | 28 |

Observation after 24 hrs of milling: Prep. #3-A, #3-B and #3-C had some settling but less than Commercial Control Dispersant #3. For 8739-006-B2 no settling was observed, 8739-006-B1 (4% DOP) less settling than Commercial Control Dispersant #3. Viscosities are low on all of samples and would be commercially acceptable. However, improved stability (i.e, less pigment settling) is an advantage of polymeric dispersants of the present invention.

Although the present invention and its advantages have been described in detail, it should be understood that various changes, substitutions and alterations may be made herein without departing from the spirit and scope of the invention as defined by the appended claims.

What is claimed is:

1. A dispersion composition comprising:
   4 to 16 percent by weight based on the total weight of the dispersion composition, of a polymeric dispersant that comprises a reaction product of a polymeric acid and a hydrophilic amine,
   wherein the polymeric acid comprises a copolymer of an acrylic acid and a maleic acid, and
   wherein the hydrophilic amine is a polyethermonoamine having a molecular weight of at least about 100; and
   15 to 60 percent by weight based on the total weight of the dispersion composition, of at least one dispersed particle, wherein the dispersed particle comprises an inorganic pigment.

2. A dispersion composition according to claim 1 wherein the inorganic pigment comprises iron oxide.

3. A dispersion composition according to claim 1 wherein the polymeric acid is reacted with the hydrophilic amine in a ratio of about 0.5-2.0:1.0 polymeric acid to hydrophilic amine.

4. A dispersion composition according to claim 1 further comprising at least one glycol.

5. A dispersion composition according to claim 1 further comprising at least one additive.

6. A dispersion composition according to claim 1 wherein the hydrophilic amine has a molecular weight of at least about 100 to about 3,000.

7. A dispersion composition according to claim 1 wherein the hydrophilic amine has a molecular weight of about 1,000.

8. A dispersion composition according to claim 1 wherein the polyethermonoamine is a mono-primary amine.

9. A dispersion composition according to claim 1 wherein the polymeric acid is reacted with the hydrophilic amine in a ratio of about 0.8-1.2:1.0 polymeric acid to hydrophilic amine.

10. A dispersion composition according to claim 1 wherein the polymeric acid is reacted with the hydrophilic amine in a ratio of about 1.0:1.0 polymeric acid to hydrophilic amine.

11. A dispersion composition according to claim 1 wherein the copolymer of an acrylic acid and a maleic acid comprises a ratio of about 1.0:1.0-7.5 moles of acrylic acid to moles of maleic acid.

12. A dispersion composition according to claim 1 wherein the reaction product occurs at a temperature of less than 100° C.

13. A dispersion composition according to claim 1 wherein the reaction product comprises a non-condensation reaction product.

14. A dispersion composition according to claim 1, wherein the polymeric acid has not been neutralized.

15. A dispersion composition according to claim 1, further comprising 25 to 81 percent by weight based on the total weight of the dispersion composition of water.

16. A dispersion composition according to claim 1, wherein the reaction product is predominantly a salt.

* * * * *